Figure 1:
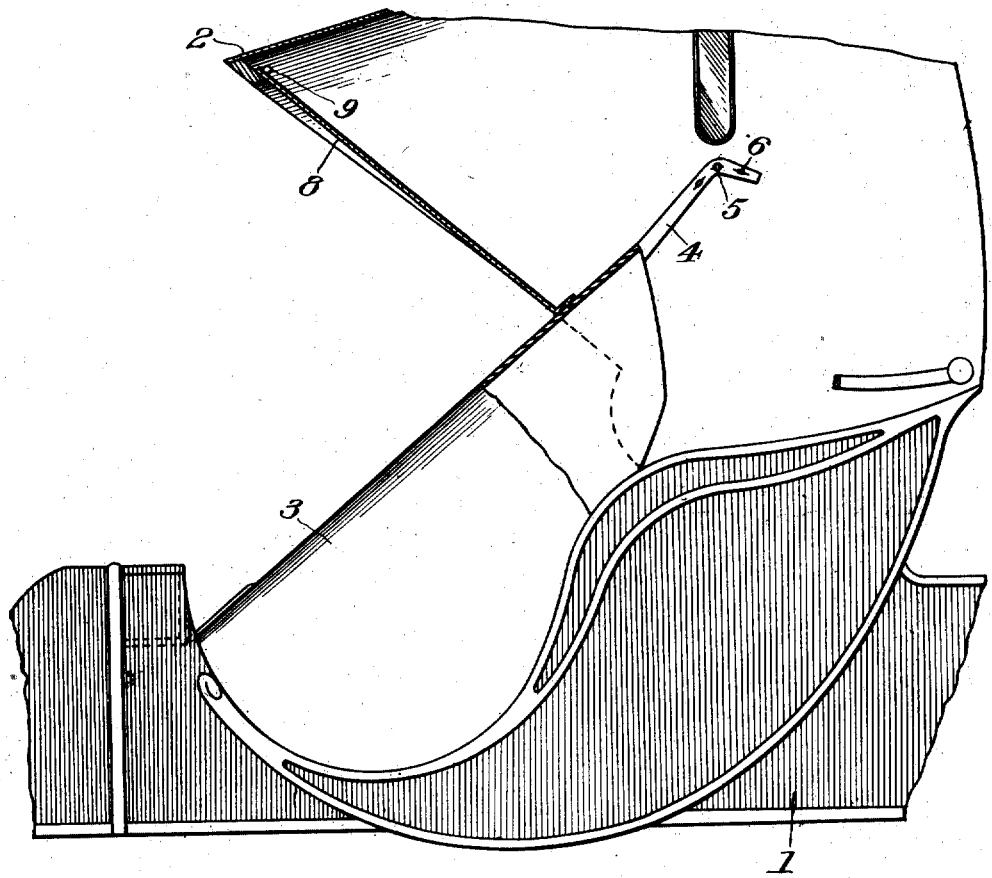

O. P. FRITCHLE.
STORM APRON FOR VEHICLES.
APPLICATION FILED JAN. 18, 1909.

995,450.

Patented June 20, 1911.
2 SHEETS—SHEET 1.

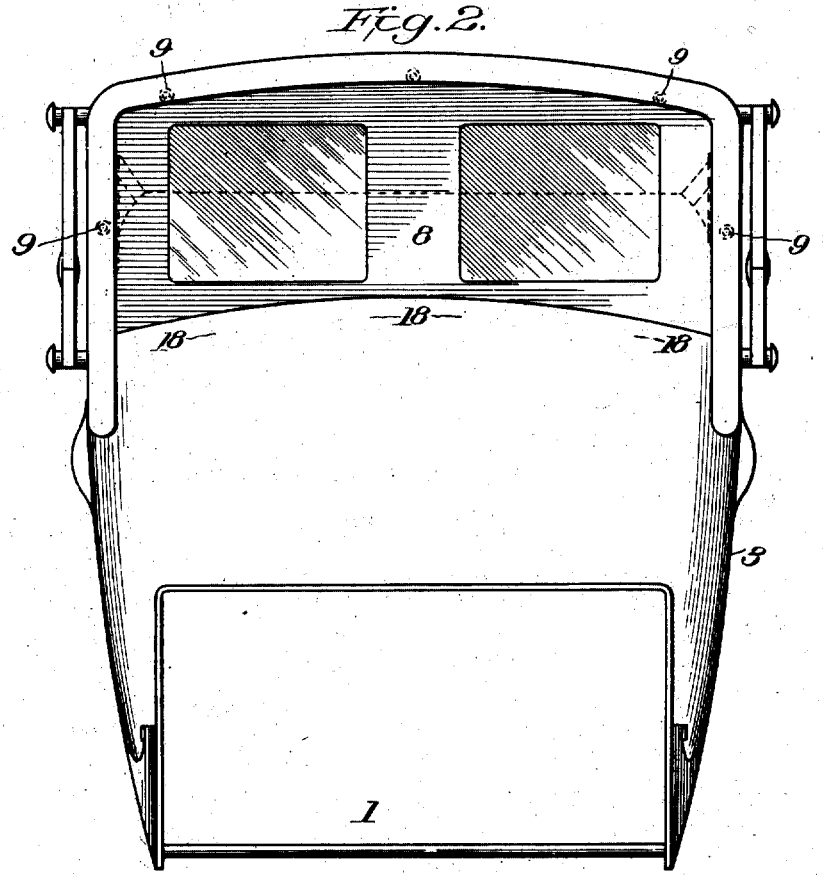
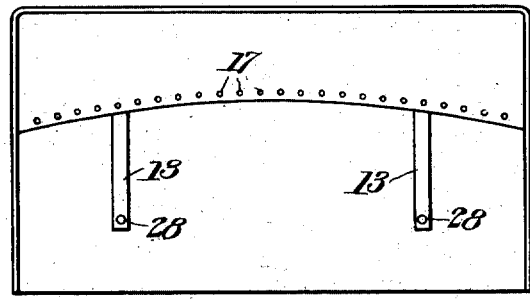 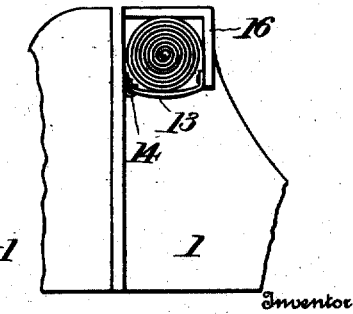

UNITED STATES PATENT OFFICE.

OLIVER P. FRITCHLE, OF DENVER, COLORADO, ASSIGNOR TO FRITCHLE AUTOMOBILE & BATTERY CO., OF DENVER, COLORADO, A CORPORATION OF COLORADO.

STORM-APRON FOR VEHICLES.

995,450.  Specification of Letters Patent.  Patented June 20, 1911.

Application filed January 18, 1909. Serial No. 472,852.

*To all whom it may concern:*

Be it known that I, OLIVER P. FRITCHLE, a citizen of the United States, residing at Denver, in the county of Denver and State of Colorado, have invented certain new and useful Improvements in Storm-Aprons for Vehicles, of which the following is a specification.

My invention relates to a storm-apron for vehicles, and has for its object to provide, for the vehicle or its occupants, a means of protection against rain or stormy weather.

To this end, I provide a detachable storm-apron, arranged to be securely fastened, when in use, to the top and sides of the vehicle, while still enabling the occupant of the vehicle to see ahead; and, in case the vehicle is an automobile, to control the operation of the car, without hindrance from the apron. Arrangements are also provided to give such shape to the apron, when secured in place, that it will shed water, and to enable the curtain when rolled up and not in use, to be conveniently stored and concealed from view.

In the accompanying drawings:—Figure 1 is a side elevation of a vehicle body, a portion of a side curtain having been broken away; Fig. 2 is a front elevational view of the vehicle body, showing the apron in its position of use; Fig. 3 is a side elevation of the means for storing the apron when not in use; and Fig. 4 is a view of the storage box as seen from the inside of the vehicle.

Referring to the drawings, 1, represents the body of the vehicle having a folding top 2, which may be of any desired construction.

3 is the apron of rubber or waterproof cloth, provided at each side with a strap 4, having holes 6, for engagement with a button 5 on one of the bars supporting the top. At its lower end the apron is permanently secured, along an upwardly curved line, by suitable fastening means 17 to the upwardly projecting box 16, to which are also secured straps 13 as shown in Fig. 3, these straps 13 having eyes or openings 28, for engagement with hooks 14.

The apron has secured to it at its upper end and along a curved line 18, 18, 18, a flap 8, having a correspondingly curved lower edge. This flap 8, has two transparent flexible windows, which may be of celluloid, and is secured to the main portion of the apron either permanently, as by sewing, or by detachable fastenings of any desired construction. It is further provided at its other edges with means for securely fastening it to the frame-work of the vehicle top. These securing means may be of any construction,—such as eyelet holes in the flap itself for engaging buttons 9. By securing the flap 8 to the main portion 3, along the curved line, 18, 18, 18, this main portion 3 is kept higher along its median line than at the edges, and owing to this convex shape, the apron sheds the rain, and there is no possibility of water being collected and held in the apron.

The operation of the device will be apparent. When in use, the apron and its upwardly and forwardly extending flaps being held securely taut completely protect the occupants of the vehicle, and allow sufficient room to permit the operation of the controlling mechanism without interference.

The apron is taken down by disengaging the various fastening devices, dropping the flap 8 onto the main portion 3, rolling or folding the apron up, and storing it under the box 16, where the straps 13 secure it in place. As the apron is light in weight and flexible this last operation can be easily performed. Further, the convenient location of the apron enables it to be put up and taken down without getting out of the seat.

The upper flap 8 of the apron is held taut by the fastening means at its upper and side edges, so that the upper edge of the main portion 3 of the apron will be firmly held with its middle portion higher than its sides.

I claim:

1. The combination with a vehicle of a storm-apron comprising two portions flexibly connected along an upwardly curved line, the lower portion of said apron being fastened at its lower edge to the inside of the vehicle, and coöperating detachable means for securing to the hood or top of the vehicle, the upper part of the lower portion of said apron and the free edges of the upper portion.

2. The combination of a vehicle having secured to its front board an inwardly projecting open bottomed box, of a storm-apron comprising two portions connected along an upwardly curved line, the lower portion of the apron being fastened at its lower edge to the lower edge of the box and coöperating detachable means for securing to the hood or top of the vehicle, the upper part of the lower portion of said apron and the free edges of the upper portion.

3. The combination of a vehicle having secured to its front board an inwardly projecting open bottomed box, of a storm-apron comprising two portions connected along an upwardly curved line, the lower portion being fastened at its lower edge along an upwardly curved line to the lower edge of the box and coöperating detachable means for securing to the hood or top of the vehicle, the upper part of the lower portion of said apron and the free edges of the upper portion.

In testimony whereof, I affix my signature in presence of two witnesses.

OLIVER P. FRITCHLE.

Witnesses:
C. C. Scott,
C. F. Benjamin.

Copies of this patent may be obtained for five cents each, by addressing the "Commissioner of Patents, Washington, D. C."